United States Patent [19]

Uenishi et al.

[11] Patent Number: 5,046,817
[45] Date of Patent: Sep. 10, 1991

[54] GENERATION OF PARALLEL SECOND HARMONIC LIGHT RAYS USING AN OPTICAL FIBER

[75] Inventors: Naota Uenishi; Takafumi Uemiya, both of Osaka, Japan

[73] Assignee: Sumitomo Electric Industries, Ltd., Osaka, Japan

[21] Appl. No.: 350,007

[22] Filed: May 9, 1989

[30] Foreign Application Priority Data

May 14, 1988 [JP] Japan .................................. 117897

[51] Int. Cl.$^5$ .......................... G02B 6/02; G02B 6/16
[52] U.S. Cl. ................................ 359/328; 358/122; 358/141
[58] Field of Search .................. 350/96.29, 96.34, 432

[56] References Cited

U.S. PATENT DOCUMENTS

| 2,759,393 | 8/1956 | McLeod | 350/432 |
| 2,881,654 | 4/1959 | Toffolo | 350/432 |
| 2,882,784 | 4/1959 | Toffolo | 350/432 |
| 3,547,526 | 12/1970 | Devereux | 350/432 |
| 4,077,699 | 3/1978 | Dyott et al. | 350/96.34 |
| 4,152,045 | 5/1979 | Hammer | 350/96.34 |
| 4,780,877 | 10/1988 | Switzer | 350/96.34 |
| 4,794,045 | 12/1988 | Robin et al. | 350/96.34 |
| 4,815,807 | 3/1989 | Kaneko et al. | 350/96.34 |
| 4,962,993 | 10/1990 | Okamoto et al. | 350/96.29 |

FOREIGN PATENT DOCUMENTS 63-15235 1/1988 Japan .
63-33716 2/1988 Japan .

Primary Examiner—William L. Sikes
Assistant Examiner—Robert E. Wise
Attorney, Agent, or Firm—Cushman, Darby & Cushman

[57] ABSTRACT

An arrangement for generating light at a second harmonic of an input light at a fundamental frequency/wavelength. Light at the fundamental frequency/wavelength is generated by a laser and impinges upon an input end of an optical fiber. The optical fiber has a non-linear optical characteristic and generates a second harmonic of the input light. The second harmonic which exits the fiber has an axisymmetrical and conical equiphase wave surface. A collimator lens collimates the second harmonic and parallel light rays are produced on the output side of the lens.

10 Claims, 3 Drawing Sheets

GENERATION OF PARALLEL SECOND HARMONIC LIGHT RAYS USING AN OPTICAL FIBER

FIELD OF THE INVENTION

This invention relates to an arrangement (method and apparatus) for generating light that is a second harmonic of light emitted from a light source. In a preferred embodiment, the light source is a laser and a fiber optic element is used to generate the second harmonic. A lens system is provided which causes the second harmonic light to have parallel rays.

BACKGROUND OF THE INVENTION

A non-linear optical effect occurs when light is incident on a non-linear optical element such as inorganic materials $KH_2PO_4$ and $LiNbO_3$. Polarization occurs which is proportional to terms of higher order and are at least equal to the square of the light of the electric field of the incident light. This allows generation of a second harmonic. Another inorganic material having a large non-linear optical constant is 2-methyl-4-nitrileaniline (MNA) which is widely used today.

It is known to form a second harmonic generating element of the light waveguide type. An elongated light waveguide for shutting in propagating light is formed on a substrate and then an overlayer is applied to the waveguide. In order to obtain second harmonic light from the waveguide, the waveguide must have a structure capable of handling the phase velocity of propagation of the wavelength of the second harmonic. The waveguide must be phase-matched with the second harmonic. The easiest method now known to phase match the waveguide with the second harmonic is to use the Cerenkov radiation system.

The Cerenkov radiation system is explained with reference to FIG. 6. Assume that a second harmonic is generated at a point A from light propagating through a light waveguide portion 11 and the second harmonic leaks out to a substrate 12 and an overlayer 13 at an angle $\Theta$. When the equiphase wave surface of the second harmonic generated at point A is coincident with the equiphase wave surface of a second harmonic generated at point B in the $\Theta$ direction, another second harmonic is emitted in the $\Theta$ direction. To attain Cerenkov radiation, only one condition must be satisfied:

$$n_s(2\omega) > n_G(\omega) > n_s(\omega)$$

where $n_s(\omega)$ is the index of refraction of the substrate with respect to a dominant wave, $n_G(\omega)$ is the index of refraction of the light waveguide, and $n_s(2\omega)$ is the index of refraction of the substrate with respect to the second harmonic.

The second harmonic generated by a second waveguide-type second harmonic generator does not have a good wave surface characteristic as it is radiated from a narrow light waveguide onto a substrate. This makes it very difficult to focus the second harmonic light to a small spot. Thus it difficult to use the resulting second harmonic light for writing and/or reading operations on an optical storage medium such as an optical disk having very fine pits.

SUMMARY OF THE INVENTION

In order to overcome these problems, the present invention provides a second harmonic light generating element using an optical fiber. Second harmonic light generated by this element emerges from it in a ring shape which is easier to focus than is second harmonic light emerging from a waveguide type second harmonic generator. Second harmonic light from the fiber optic element can be altered so that the light rays are parallel when they exit the second harmonic generator, thus making the second harmonic light easy to focus.

The presently preferred embodiment of the present invention uses a laser light source to provide light at a "fundamental" wavelength. An optical fiber element generates the second harmonic from the laser light. A collimator lens causes the rays of light emerging from the optical fiber to become parallel rays.

BRIEF DESCRIPTION OF THE DRAWINGS

The invention will be described in further detail in conjunction with the drawings in which.

DETAILED DESCRIPTION OF THE PRESENTLY PREFERRED EXEMPLARY EMBODIMENT

Figure 1:
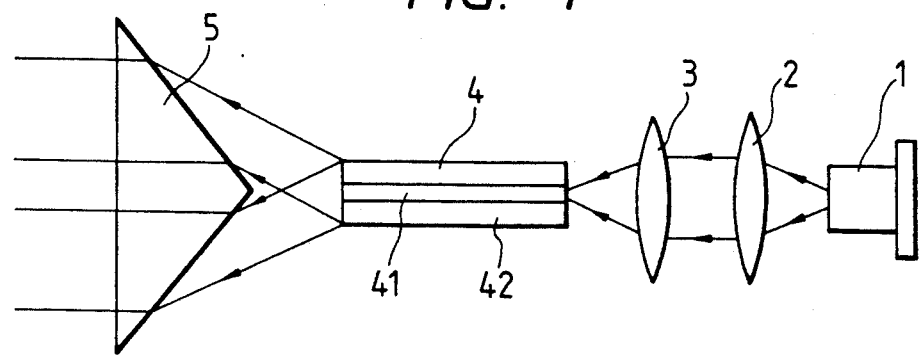
FIG. 1 is a diagram illustrating the configuration of the present invention.

Referring to FIG. 1, a laser 1 emits light that falls on a spherical collimating lens 2. Laser 1 could be a semiconductor laser or some other sort of laser. Collimating lens 2 directs the laser light toward a converging lens 3 which converges the light toward an optical fiber 4 which will generate a second harmonic wave.

The optical fiber 4 comprises both a core 41 and a clad 42. Core 41 is made from a non-linear optical material such as MNA. The light leaving the fiber 4 is second harmonic light. The second harmonic light falls upon conical collimator 5, from which the light rays are parallel upon exit. Glass is the usual material for clad 42. The optical axis of collimator 5 is situated so that it is aligned with the symmetrical axis of optical fiber 4.

Figure 4A:
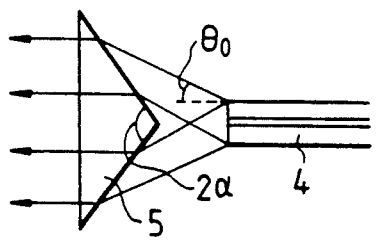
FIGS. 4a-4c illustrate various conditions of beam refraction within the collimator lens.

As shown in FIG. 4a, the second harmonic emitted from fiber 4 impinges on collimator 5 at an angle $\Theta_o$ relative to the symmetrical (major) axis of fiber 4. According to Snell's law, the second harmonic is refracted at an angle $\alpha$ where:

$$\tan \alpha = (n - \cos\Theta_o)/\sin\Theta_o$$

It is possible to obtain parallel light rays from the refracted light if the center axis of the conical collimator lens 5 is set so that it is parallel to the center axis of optical fiber 4 and the vertical angle of the cone is selected to be $2\alpha$.

Figure 2:
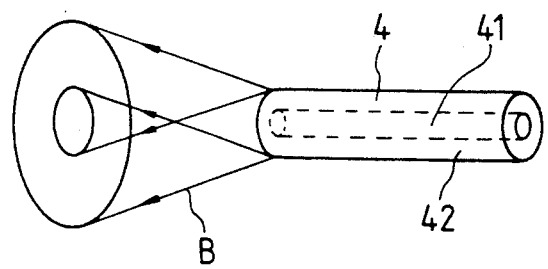
FIG. 2 illustrates a beam emitted from the optical fiber.

FIG. 2 depicts a second harmonic exiting from optical fiber 4. The second harmonic passes through clad 42 of fiber 4 and then propagates forward in the form of a conical beam B. Therefore, if the second harmonic passes through a collimator lens at least partly having an inclined circular symmetrical surface, it is possible to achieve parallel light rays.

Figures 3A, 3B, 3C, 3D:
FIGS. 3a-3g are diagrams illustrating several possibilities for shape of a collimator lens.
Figures 3E, 3F, 3G:
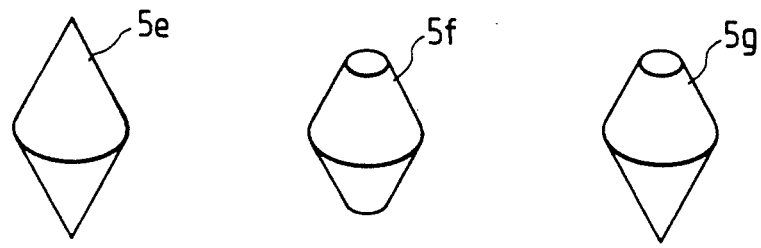

The shape of the collimator lens 5 is not limited to a conical shape. For example, as shown in FIG. 3, it is possible to utilize a conical shape 5a as shown in (a), a truncated cone 5b as shown in (b), a cone with a cylindrical columnar base 5c as shown in (c) or a truncated cone with a cylindrical columnar base 5d as shown in (d). Still further possibilities exist for collimator lens 5. Such possibilities include a double-sided cone 5e depicted in (e) where the respective cone bottoms are fitted with one another, a double-sided truncated cone 5f shown in (f) where the larger flat surfaces are fitted with one another, or a shape where a truncated cone joins a cone 5g with their respective bottoms fitting together as shown in (g). Because the collimator lens has such an inclined circular symmetrical surface, it is possible to have parallel exiting light rays.

Figure 4B:
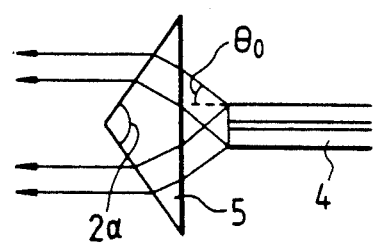

Using any of the shapes depicted in FIG. 3 as the collimator lens, the vertical angle of the inclined surface can be calculated by manipulating Snell's law. As shown in FIG. 4(b), if light is incident to the bottom surface of conical collimator, it is advantageous to use lens 5, having a vertical angle of $2\alpha$. The angle $\alpha$ can be found from the equation:

$$\tan \alpha = (\sqrt{n^2 - \sin^2\theta_0} - 1)/\sin\theta_0$$

Figure 4C:
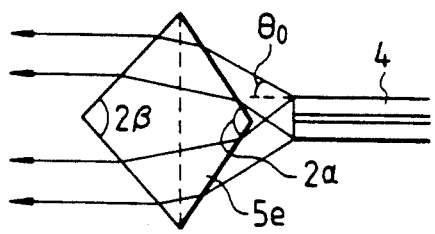
Figure 5A:
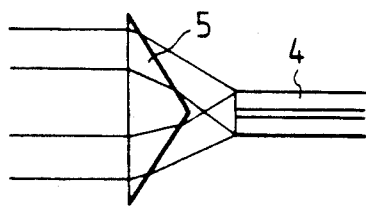
FIGS. 5a-5p illustrate the positional relationship between various collimator lenses and an optical fiber which generates second harmonic waves.
Figure 5B:
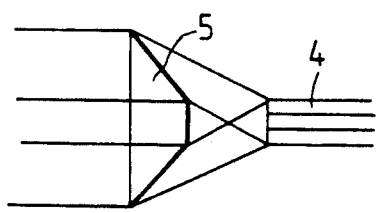
Figure 5C:
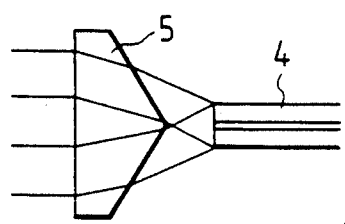
Figure 5D:
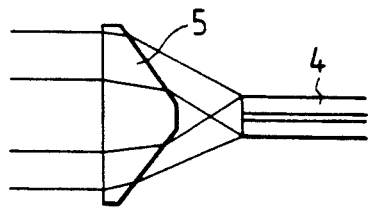
Figure 5E:
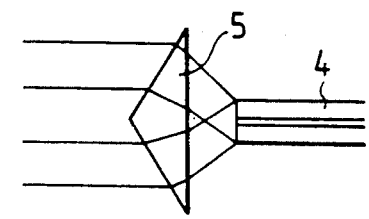
Figure 5F:
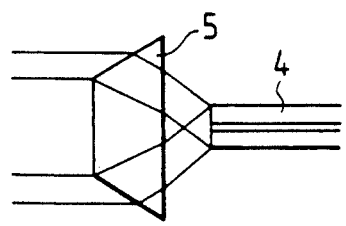
Figure 5G:
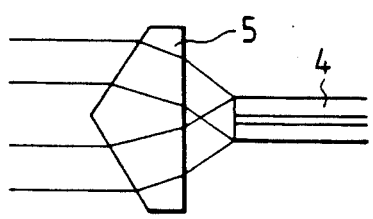
Figure 5H:
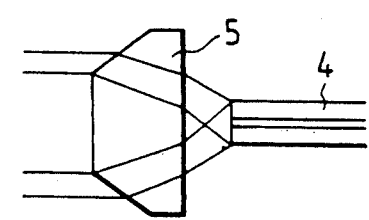
Figure 5I:
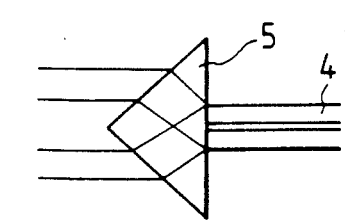
Figure 5J:
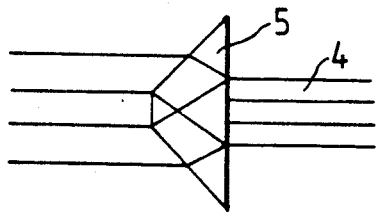
Figure 5K:
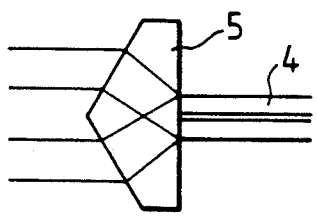
Figure 5L:
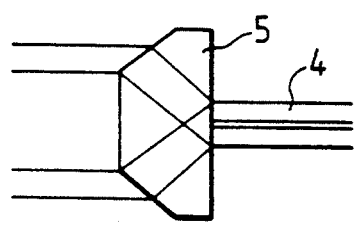
Figure 5M:
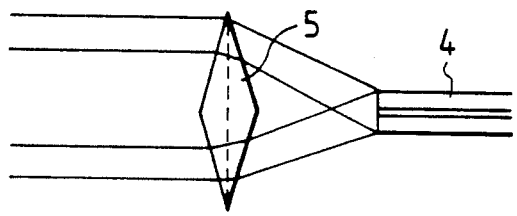
Figure 5N:
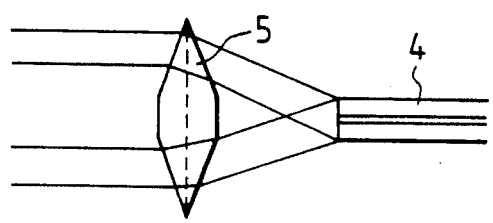
Figure 5O:
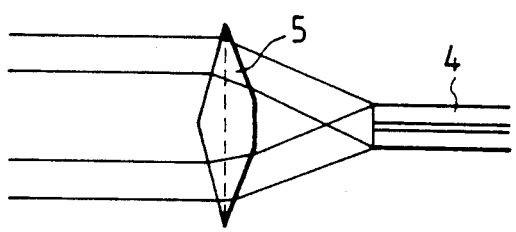
Figure 5P:
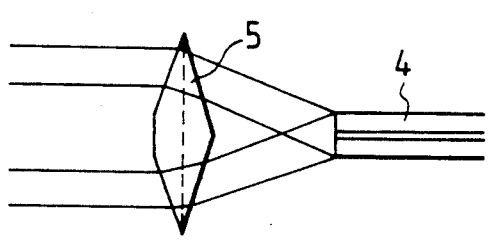
Figure 6:
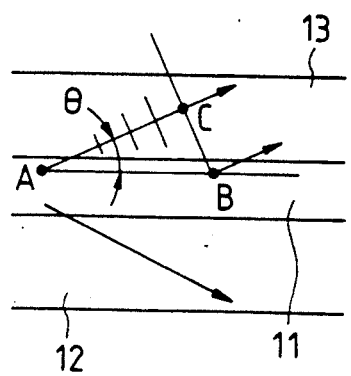
FIG. 6 is a drawing showing a Cerenkov radiation system.

If a double sided conical lens is used as is shown in FIG. 4(c) the situation is somewhat more complicated. The collimator lens pictured 5e is similar to the one shown in FIG. 3(e). The apex angles, $2\alpha$ and $2\beta$, of the adjacent cones can be found by finding $\alpha$ and $\beta$ which satisfy:

$$\cos\beta = \cos(\alpha + \beta)\cos(\alpha - \theta_0) + \sin(\alpha + \beta)\sqrt{n^2 - \cos^2(\alpha - \theta_0)}$$

Referring to FIG. 5, the positional relationship between the collimator lenses 5a–5g depicted in FIG. 3 and the output side of the optical fiber 4 is shown. FIGS. 5(a) to 5(d) show arrangements of collimator 5 in which the surface of the light output side is a planar surface. In FIGS. 5(e) to 5(h), arrangements of the collimator lens 5 in which the surface of the light input side is planar are depicted. FIGS. 5(i) to 5(l) show configurations in which the light input surface is planar and in contact with the light output end of optical fiber 4. Using any of these arrangements 5(i)–5(l) allows the apparatus to be small in size. Each of FIGS. 5(m) to 5(p) shows a possible arrangement of collimator lens 5 having inclined opposite surfaces. By using collimator lenses having inclined opposite surfaces, it is possible to use lenses with a smaller incline angle than in lenses with only one surface inclined, therefore making it possible to reduce reflection at the input side of the collimator lens. In any of FIGS. 5(a) to 5(p), a columnar beam is output from the apparatus. By converging the columnar beam, it is possible to obtain a small spot size which substantially agrees with the limitation of the wavelength of light.

While the invention has been described in connection with what is presently considered to be the most practical and preferred embodiment, it is to be understood that the invention is not limited to the disclosed embodiment, but is intended to cover various modifications and equivalent arrangements included within the spirit and scope of the appended claims.

We claim:

1. Apparatus for generating parallel second harmonic light rays comprising:
    a laser light source capable of emitting a light at a fundamental frequency/wavelength;
    an optical fiber made of a material having non-linear optical characteristic for generating second harmonic light using Cherenkov radiation in response to said fundamental frequency/wavelength light from said laser light source, said second harmonic light exiting as a ring of light and having a conical wave surface; and
    a collimator lens having an inclined circular symmetrical surface for converting said ring of second harmonic light output from said optical fiber into parallel light rays.

2. Apparatus as in claim 1, further comprising means for converging light emitted from said laser light source onto an input end of said optical fiber.

3. Apparatus as in claim 1 wherein said optical fiber comprises a core and a clad.

4. Apparatus as in claim 1 wherein said collimator lens is conical in shape.

5. Apparatus as in claim 1 wherein said collimator lens is in the shape of a truncated cone.

6. Apparatus as in claim 1 wherein said collimator lens is in the shape of a cone having a cylindrical columnar support.

7. Apparatus as in claim 1 wherein said collimator lens is in the shape of a truncated cone having a cylindrical columnar support.

8. Apparatus as in claim 1 wherein said collimator lens has opposite inclined sides.

9. Apparatus as in claim 1 wherein an output end of said optical fiber and an input side of said collimator lens are touching one another.

10. A method for generating parallel rays of a second harmonic comprising the steps of:
    generating laser light at a fundamental frequency/wavelength;
    causing the fundamental frequency/wavelength light to impinge on an optical fiber made of a non-linear material which, in response, generates light at a second harmonic of said fundamental frequency/wavelength, said second harmonic exiting said fiber as a ring of light having a conical wave surface; and
    collimating said ring of said harmonic light using a collimator lens disposed so that said lens' axis is aligned with said optical fiber's axis of symmetry.

* * * * *